United States Patent
Kaminsky et al.

(10) Patent No.: US 7,861,181 B2
(45) Date of Patent: Dec. 28, 2010

(54) AUTONOMIC USER INTERFACE WIDGETS

(75) Inventors: David L. Kaminsky, Chapel Hill, NC (US); Christopher J. Rogus, Raleigh, NC (US); Kyle M. Smith, White River Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 2358 days.

(21) Appl. No.: 10/652,109

(22) Filed: Aug. 29, 2003

(65) Prior Publication Data

US 2005/0049989 A1 Mar. 3, 2005

(51) Int. Cl.
*G06F 3/048* (2006.01)
(52) U.S. Cl. .................. 715/765; 715/764; 715/744
(58) Field of Classification Search .............. 715/506, 715/513, 708, 255, 764, 765, 744, 747
See application file for complete search history.

(56) References Cited

U.S. PATENT DOCUMENTS

| | | | |
|---|---|---|---|
| 5,974,262 A | | 10/1999 | Fuller et al. |
| 5,999,948 A | * | 12/1999 | Nelson et al. ............ 715/506 |
| 6,601,233 B1 | * | 7/2003 | Underwood ............. 717/102 |
| 6,718,535 B1 | * | 4/2004 | Underwood ............. 717/101 |
| 2002/0065946 A1 | * | 5/2002 | Narayan ................ 709/315 |
| 2002/0103660 A1 | | 8/2002 | Cramon et al. |
| 2002/0174230 A1 | | 11/2002 | Gudorf et al. |
| 2004/0060038 A1 | * | 3/2004 | Johnston-Watt et al. ... 717/120 |

* cited by examiner

*Primary Examiner*—Adam L Basehoar
(74) *Attorney, Agent, or Firm*—Jeanine S. Ray-Yarletts, Esq.; Steven M. Greenberg, Esq.; Carey Rodriguez Greenberg & Paul LLP

(57) ABSTRACT

A method, system and apparatus for autonomically configuring a user interface. The system can include at least one widget programmed to be disposed in the user interface. The widget can include a dynamically configurable presentation field. Additionally, the system can include a policy defined by one or more business rules for configuring the widget in the user interface based upon a context provided by the widget. Finally, the system can include a rules engine configured to process the business rules. Notably, the widget can be a widget configured to be disposed in a markup language document. The business rules which define the policy of the present invention can include a multiplicity of rules which both define and constrain the level of complexity of user interface widgets in the user interface.

1 Claim, 2 Drawing Sheets

AUTONOMIC USER INTERFACE WIDGETS

BACKGROUND OF THE INVENTION

1. Statement of the Technical Field

The present invention relates to the field of computer-human interactions and more particularly to the configuration of a user interface to facilitate computer-human interactions through the user interface.

2. Description of the Related Art

Contemporary computing applications, particularly those deployed across the enterprise, have become complicated, feature-laden systems. The increased functionality of computing applications all too often can result in overly difficult to navigate user interface. At the very least, with the increased functionality of a computing application, the end user can be presented with additional application options within the user interface, and such operation can require extensive training on behalf of the typical end user. Worse yet, to the less technically adept end user, a more complicated user interface can seem overwhelming. By comparison, to the experienced end user, the complicated user interface can seem unnecessarily slow to navigate.

Developers remain painfully aware of the rising issues associated with the increasing complexity of their applications. In response, a number of solutions have been presented, all of which have been universally implemented in some combination and in varying degrees. Of the known solutions to the increasing complexity of computing applications, the use of help files represents the predominant solution. In the help file solution as applied to markup language defined user interfaces, a help icon can be associated with any page in the user interface. Occasionally, context specific help can be provided for explaining particular aspects of the user interface, but frequently such context sensitive help components merely refer the end user to a specific portion of the primary help file. In any case, such files do not directly input data into the user interface.

It will be recognized by the skilled artisan that help files as a general proposition and by necessity, are designed to be both thorough and complete in their documentation of the features of the user interface. As such, help files can be expansive documents whose navigation can be slow and cumbersome. Moreover, navigating a help file to an appropriate section can require advanced knowledge of the problem at hand. Where the beginning user poorly understands the nature of the problem, it is possible that an inappropriate section of the help file can misguide the beginning user in addressing the problem. Thus, help files can introduce as many problems as solutions for the beginning user.

Once a help file has been unsuccessfully consulted, guesswork remains the only recourse available to the end user. This can be the case particularly where the cumbersome and slow nature of the help file has discouraged ongoing use of the help file. Consequently, many users simply guess at required input values in a user interface which can result in both error and frustration. Even when a legal set of values are found through guesswork, those values are often poor choices, and are very seldom optimal. Using guesswork, the end user simply can navigate the user interface through a process of trial and error—or more appropriately, trial and error messages! The application of blatant guesswork hardly can be viewed as the ideal mode of interacting with a computer application. Discovering the error in interacting with a component of a user interface only after the end user has provided the interaction can potentially cause damage to the system. Moreover, to undo unintended changes performed in consequence of the error can consume valuable time and resources. Thus, repeated errors in user interface interactions can consume valuable time and can discourage the use of the computing application.

To protect the inexperienced user from incorrectly interacting with a user interface, particularly in respect to critical options presented through the user interface, default selections can be established for the critical options. Additionally, restrictions and requirements can be applied to selected fields of the user interface. Still, the establishment of default selections, restrictions and requirements seldom are explained. Moreover, default selections typically represent acceptable input, not optimal input. In any case, the end user typically remains unaware that their interactions with the user interface may have accepted the default position pre-programmed for elements of the user interface. Worse yet, in the case of an incorrect interaction, only a generic error message may be presented.

SUMMARY OF THE INVENTION

The present invention addresses the deficiencies of the art in respect to rendering a navigable and user-friendly user interface and provides a novel and non-obvious method, system and apparatus for autonomically configuring widgets within a user interface to dynamically and uniformly specify the complexity of the user interface. A system for autonomically configuring a user interface can include at least one widget programmed to be disposed in the user interface. The widget can include a dynamically configurable presentation field. Additionally, the system can include a policy defined by one or more business rules for configuring the widget in the user interface based both upon a context provided by the widget and other contexts stored within the system. Finally, the system can include a rules engine configured to process the business rules. Notably, the widget can be a widget configured to be disposed in a markup language document.

The business rules which define the policy of the present invention can include a multiplicity of rules which both define and constrain the level of complexity of user interface widgets in the user interface. Exemplary rules can include rules which specify at least one suggested option to be presented to an end user through the widget. Exemplary rules further can include rules which specify at least one option which is not to be presented to an end user through the widget. Exemplary rules yet further can specify rules for validating input provided through the presentation field. Finally, exemplary rules yet further can specify rules for suggesting an input value for use within the presentation field. In all cases, however, by decoupling the rules for configuring the widgets of the user interface from the user interface itself, a more uniform and user friendly environment can be constructed in a manner tailored to a particular end user or end user environment.

A method for autonomically configuring a user interface widget can include two principal steps. First, business rules can be evaluated for configuring the user interface widget according to one or both of context information for the user interface widget and other stored context information. Subsequently, the user interface widget can be configured with options permitted by the evaluation. Notably, the configuring step can include suggesting at least one option to be presented to an end user through the user interface widget. The configuring step also can include filtering at least one option from being presented to an end user through the user interface widget. Finally, the configuring step yet further can include validating input provided through a presentation field in the user interface.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for autonomically configuring a user interface widget disposed in a user interface such as a graphical user interface (GUI), or an audio user interface (AUI). In accordance with the present invention, an autonomically configurable widget can be disposed in a user interface. The user interface can be a traditional user interface associated with and generated by an executable application, or the user interface can be a distributed user interface associated with a distributed application. In the latter case, the user interface can be defined within a markup language document, such as a Web page.

A policy can be defined according to a selection of business rules for configuring user interface widgets within the user interface. Contingent upon a class of users or user environments, the business rules can specify, for instance, the level of usage permitted within the application, the level of assistance required for a particular class of user in their respective use of the application, and the type of input which can be processed through any one of a selection of widgets within the user interface, to name a few. While the foregoing illustrates a broad range of rules specifications linked to the class or identify of the user, the skilled artisan will recognize that the business rules specifications can be linked as well to the user environment, such as time of day, the identity of the computing client in which the user interface has been rendered, or the location of the end user.

Additional business rules specifications can include rules which specify a policy such as "no backups from 8:00 AM to 5:00 PM". In consequence of such a rule, when configuring a backup time for a resource equipped with this invention, those times would not be shown in a user interface through which the backup time can be configured. Similar rules might prohibit backups within an hour of one another.

The context of the widgets within the user interface can be processed individually in reference to the business rules of the policy. More particularly, for each widget, the business rules can be applied to the widget in respect to the context to produce a dynamic configuration. The dynamic configuration can include, for instance, a recommended set of options which can be activated in the widget, a reduction in a set of available options in the widget, or the validation of input provided through the widget. Once configured, the widget can be rendered within the user interface to provide dynamically configured operability based upon the context of the widget as constrained by the business rules of the policy.

Figure 1:
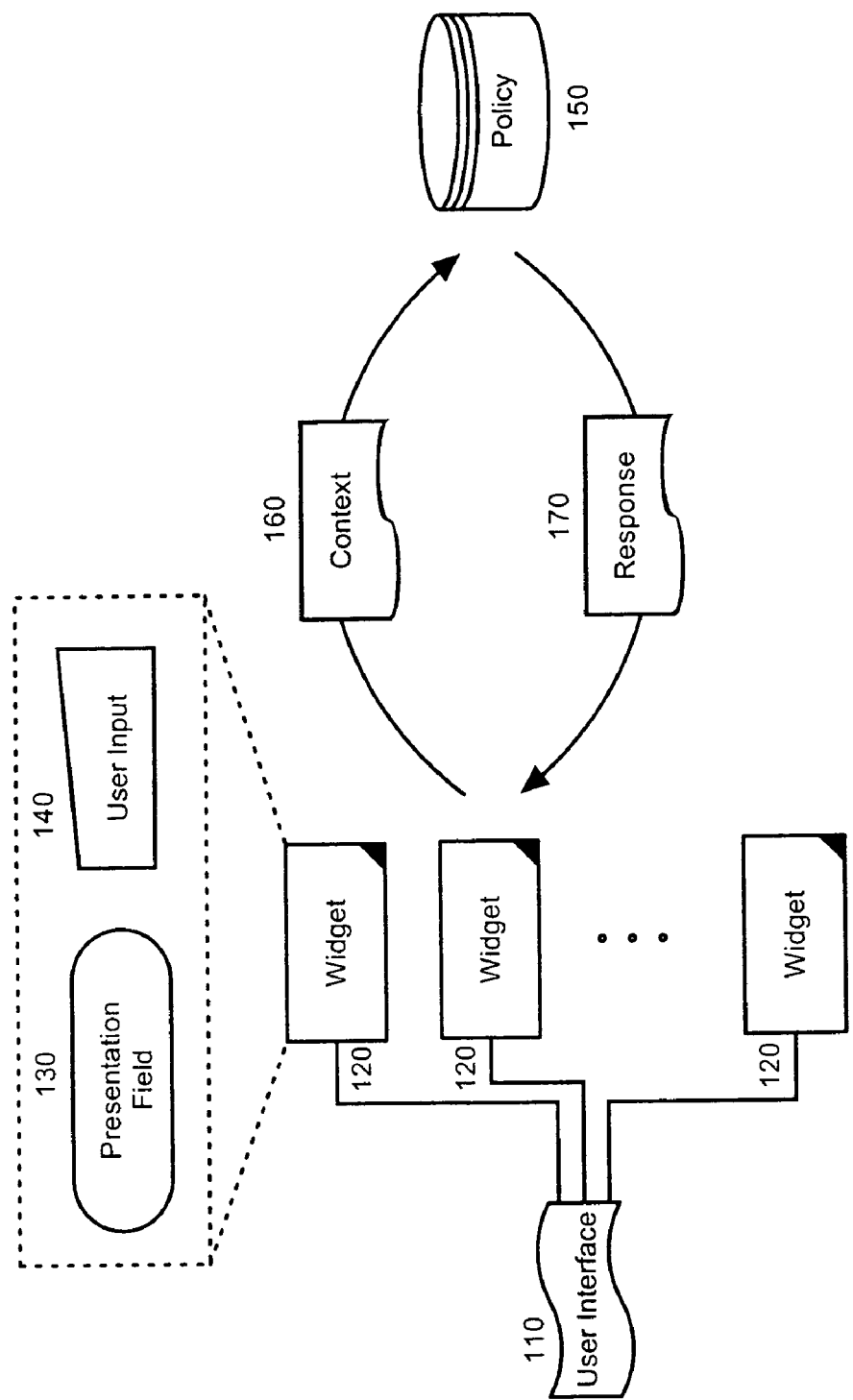
FIG. 1 is a block diagram illustrating a system for autonomically configuring user interface widgets in a user interface; and, FIG. 2 is a flow chart illustrating a process for autonomically configuring a user interface widget in the system of FIG. 1.

FIG. 1 is a block diagram illustrating a system for autonomically configuring user interface widgets in a user interface. The system can include a user interface 110 in which a multiplicity of user interface widgets 120 are defined. In this regard, the user interface 110 can include a programmatically defined user interface such as that ordinarily encountered within a conventionally compiled application, or a markup language defined user interface such as that ordinarily encountered in association with a Web application. In either case, each widget 120 can include a presentation field 130 through which user input 140 can be provided.

A policy 150 defined according to a set of business rules (not shown) further can be provided in the system of the present invention. The business rules can specify the options provided through the widget 120, the input 140 which can be accepted for processing through the presentation field 130 of the widget 120, and an optimal default value for the presentation field 130 of the widget 120. In this regard, the options can be specified based upon the state of the user interface such as the values provided in the presentation fields of other widgets in the user interface. The options further can be dependent upon the context 160 of the widget 120. The context 160 can indicate a level of sophistication of the end user. The level of sophistication can be indicated directly by value, or indirectly by reference to the state of the application such as whether the end user has repeatedly provide invalid input through a widget. In this regard, the context 160 can include values defined directly by the widget 120, or values defined in relation to the widget 120.

In any case, based upon the policy 150, the complexity of the user interface 110 can be tailored to either or both of the user and the user environment. In particular, the context 160 can be provided by the user interface 110 to the policy 150 prior to rendering the user interface 110 and preferably in preparation to render the user interface 110. The business rules of the policy 150 can process the configuration for the widget 120 corresponding to the context 160 in the form of a response 170. The response 170 can indicate, for example, suggested interactive options to be provided by the corresponding widget 120, a specification of unavailable options, or a manner of validating user input 140 provided through the presentation field 130. In any case, based upon the response, the widget 120 can autonomically configure itself according to the options specified in the response 170.

Figure 2:
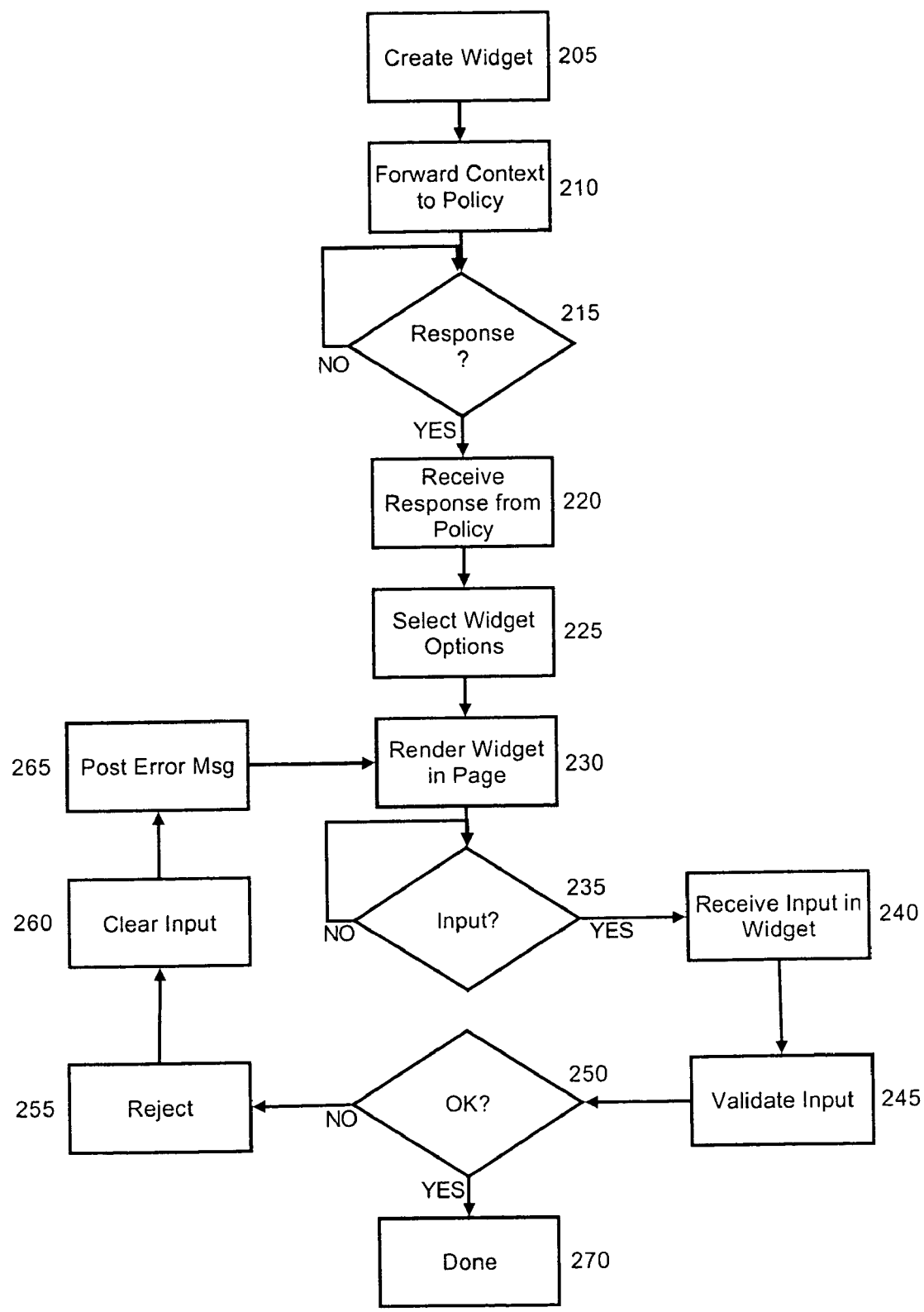

FIG. 2 is a flow chart illustrating a process for autonomically configuring a user interface widget in the system of FIG. 1. Beginning in block 205, an instance of a widget can be created within a user interface. In block 210, the context of the widget instance can be forwarded to the policy for processing in accordance with the business rules of the policy. In decision block 215, it can be determined whether a response has been received in respect to the context of the widget provided to the policy in block 210. If so, in block 220 the response can be received and examined. Otherwise, the widget instance can wait for a response.

In block 225 the options of the widget can be selected in accordance with the recommendations and constraints of the response. More specifically, a rules engine can process the business rules using the context as a parameter to produce a selection of recommended options to be presented through the widget. The context can include not only those values associated directly with the widget, but also those values associated other widgets in the user interface. The response can constrain certain options tending to complicate the user interface. Moreover, the response can specify validation rules for accepting or rejecting input provided through the widget. Based upon the configuration, the widget can be rendered and the widget can await user input in decision block 235.

In block 240, once input has been provided through the widget, in block 245 the input can be validated according to the validation rules specified in the response. If the user input validates in decision block 250, the process can end in block 270. However, if the user input fails to validate in decision block 250, the user input can be rejected in block 255 and the user input 260 can be cleared in the presentation field of the widget. In block 265, an error message can be posted to the user interface and the process can continue once again in blocks 230 through 270.

Importantly, the skilled artisan will recognize that the autonomic configuration of widgets in a user interface can prove significantly more effective than deploying a conventional help system. In particular, the user interfaces can be greatly simplified and can be presented more completely with greater options only where the end user is considered more sophisticated and able to handle a more complex user interface. Additionally, as the business rules governing the configuration of the user interface can be decoupled from the user interface itself, consistency can be maintained in respect to user interaction with the user interface. Finally, through an external policy, universally-enforced constraints can be applied to input provided through the presentation fields of the respective widgets.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A machine readable storage having stored thereon a computer program for autonomically configuring a user interface widget, the computer program comprising a routine set of instructions for causing the machine to perform the steps of:

evaluating business rules for configuring the user interface widget according to context information for the user interface widget; and, configuring the user interface widget with options permitted by said evaluation, wherein said configuring step comprises the step of filtering at least one option from being presented to an end user through said user interface widget.

* * * * *